United States Patent

[11] 3,584,698

| [72] | Inventors | Robert V. Larson<br>Peoria;<br>James E. Scheidt, Joliet; Sebald K. Stahl,<br>Peoria, all of, Ill. |
|---|---|---|
| [21] | Appl. No. | 746,971 |
| [22] | Filed | July 23, 1968 |
| [45] | Patented | June 15, 1971 |
| [73] | Assignee | Caterpillar Tractor Co.<br>Peoria, Ill. |

[54] HYDROSTATIC SCRAPER WHEEL DRIVE
5 Claims, 6 Drawing Figs.

[52] U.S. Cl..................................................... 180/14A,
60/53, 180/44 (M), 180/51, 180/53
[51] Int. Cl........................................................B60k 25/00,
B62d 59/00
[50] Field of Search............................................ 180/44 M,
66, 51, 14, 14 A, 12; 37/156, 156 A

[56] References Cited
UNITED STATES PATENTS

| 3,339,660 | 9/1967 | Budzich........................ | 180/44 M |
| 3,354,978 | 11/1967 | Budzich........................ | 180/44 M |
| 2,904,905 | 9/1959 | Armington ................... | 180/44 X |
| 2,913,061 | 11/1959 | Beyerstedt et al. ............ | 180/51 X |
| 3,227,235 | 1/1966 | Budzich et al. ............... | 180/14 (A) |
| 3,293,942 | 12/1966 | Stein et al. .................... | 180/14 (A) X |
| 3,480,099 | 11/1969 | Nighswonger et al. ....... | 180/44 (M) |

*Primary Examiner*—A. Harry Levy
*Attorney*—Fryer, Tjensvold, Feix, Phillips & Lempio

ABSTRACT: A hydrostatic assist for driving the normally nondriven wheels of a vehicle in which the hydrostatic assist is controlled by slip in the drive train or the driven wheels for better tractive effort and most efficient operation. The slip sensed for control may be the slip between the normally driven wheels and the ground or the slip in a nonpositive coupling portion of the drive line between the vehicle engine and the driven wheels and controls the power which is supplied to the nondriven wheels through a hydrostatic loop.

INVENTOR'S
ROBERT V. LARSON
JAMES E. SCHEIDT
BY SEBALD K. STAHL

ATTORNEYS

INVENTOR'S
ROBERT V. LARSON
JAMES E. SCHEIDT
BY SEBALD K. STAHL
ATTORNEYS 3,584,698

HYDROSTATIC SCRAPER WHEEL DRIVE

BACKGROUND OF THE INVENTION

The present invention relates to supplementary vehicle drives and more particularly to a hydrostatic assist for driving the normally nonpowered wheels of the vehicle. Such a hydrostatic assist is especially beneficial for driving the trailer wheels of an articulated vehicle, where otherwise, a mechanical drive link is difficult to provide. The term "articulated vehicle" is used to refer to a vehicle wherein a fifth wheel steering is provided between two halves of the vehicle and wherein normally only two of the four wheels of the vehicle are driven. An example of such a vehicle is a scraper wherein a tractor unit pulls a trailer unit having a bowl with means for raising and lowering the bowl in order that the bowl may be filled with earth.

Vehicles of the scraper type typically have the problem of providing sufficient tractive effort to fully load the bowl as the scraper moves across the ground. The problem of providing sufficient tractive effort to drive the scraper is difficult due to the slip of the tractor wheels when only the wheels of the tractor are driven.

In the past, to overcome the problem of the tractor wheels slipping, it has been suggested that drives be provided for driving the rear scraper wheels. These drives have consisted of both hydraulic (hydrostatic) and mechanical drives to transmit power to the rear wheels. While all the above solution will provide power to the scraper, they all require the operator actuating the drive mechanism to control power to the rear scraper wheels. Thus, the operator may delay in applying power to the rear wheels until the unit has lost its forward motion so that the full advantage of the power transfer in an assist drive is lost. Further, the requirement of manual actuation of the assist drive mechanism requires the operator to divert his attention from the loading operation, which can compound the problems rather than solve them. When the operator's attention is diverted to operating the assist drive mechanism, accidents are more likely to occur. There are large scrapers which have separate engines driving the rear wheels of a scraper, and it is the object of this invention to achieve some of the advantages obtained in two engine scrapers in the single engine, tractor-drawn scrapers.

SUMMARY OF THE INVENTION

The present invention solves the above problems by providing a hydrostatic assist means for driving a set of wheels of a vehicle which are not normally directly driven by the power plant and includes a power transfer system which supplies power to a set of nondrive wheels only when the power being delivered to the normally powered wheels is about to exceed or exceeds the tractive capacity of the tires on the ground. The power transfer system can be responsive either to the actual slipping of the wheels on the ground or to slip in a nonpositive coupling between the drive motor and the normally driven wheels.

In one embodiment of the invention, a hydraulic pump is coupled to a shaft of a transmission and selected so the fluid capacity of the pump, as related to the fluid capacity of the hydraulic motor units driving the nondriven wheels, is such that no power is transferred to these wheels, unless the driven wheels are slipping on the ground. The system can also include gear means by which gear ratio between the drive assist motors on the trailer wheels may be shifted or varied as the transmission on the tractor unit is shifted from one speed range to the next.

In a second embodiment of the invention, a hydraulic pump is connected to the input of a nonpositive coupling so that no power is transferred unless substantial slippage is occurring in the coupling. This second embodiment also includes means by which the final drive between the motors and the scraper wheels may be varied as the transmission on the tractor is shifted and the same relative fluid capacity between the pump and motor units is maintained.

BRIEF DESCRIPTION OF THE DRAWINGS

The present invention will be more fully understood from the following detailed description of preferred embodiments when taken in conjunction with the attached drawings, in which.

DESCRIPTION OF THE PREFERRED EMBODIMENT

For the purpose of the description, a single engine scraper is used as the operable embodiment. In such a machine the tractor pulls the unit and for convenience the tractor wheels are depicted as the normally driven wheels and the rear scraper wheels are the normally nondriven wheels.

Figure 1:
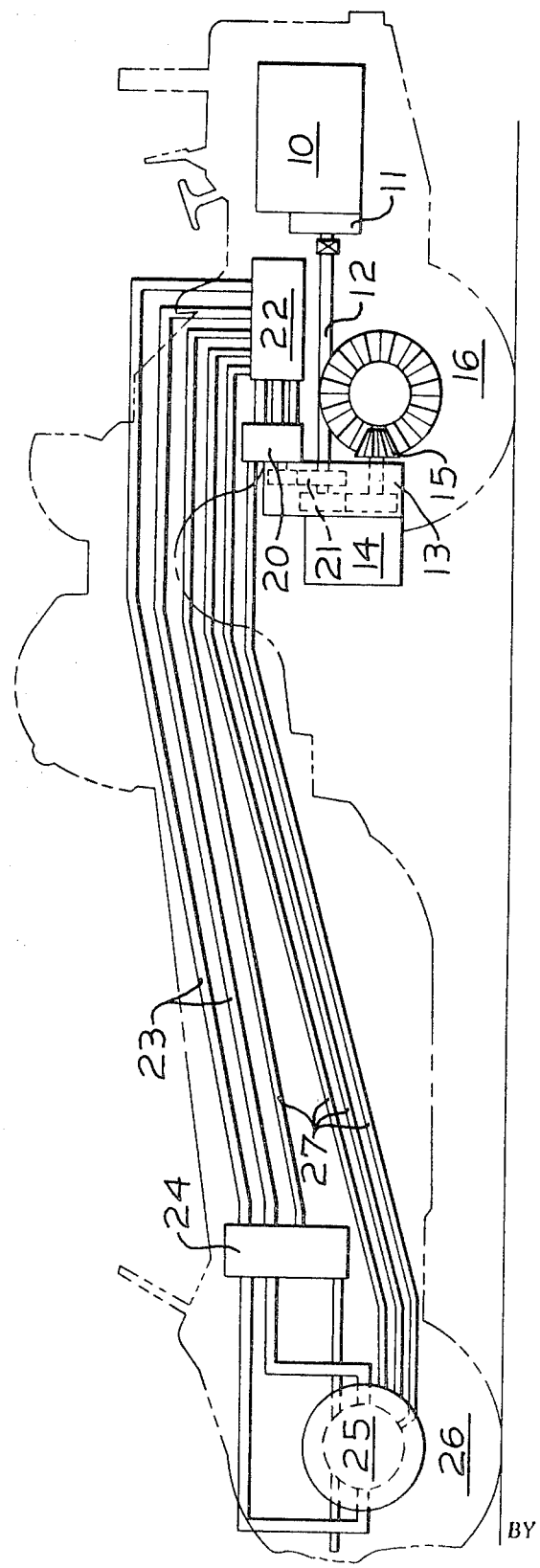
FIG. 1 is a phantom elevation of a tractor-scraper unit showing a hydrostatic assist unit installed.

Referring to FIG. 1 showing a scraper arrangement, an engine 10 is located in a tractor unit and coupled by means of a torque converter 11 and a shaft 12 to a power transfer gear box 13. A gear box 13 is coupled through a power transmission 14 to a ring and pinion gear assembly 15. This ring and pinion gear assembly drives the tractor wheels 16. The power transmission 14 contains shifting means for varying the gear ratios in the drive train and reversing the direction of vehicle drive. This may be done with clutches and similar devices which are known in the art.

A hydraulic pump 20 is coupled through suitable gears to a gear 21 on the output shaft 12 of the torque converter 11. Drivingly connecting the pump to the transmission input provides a safe, maximum pump speed which does not change as transmission 14 is shifted in speed ranges. The pump is coupled to a hydraulic reservoir and control means 22 located on the tractor. The control means is coupled by means of hydraulic lines 23 to a flow-diverting valve 24 disposed on the scraper or trailer unit. The flow-diverting valve 24 is coupled with conduits to the hydrostatic drive motors 25 adjacent to the rear wheels of the scraper unit. These hydrostatic drive motors are connected through suitable gear transmission to the rear scraper wheels 26. A series of control lines 27 are provided for coupling the control devices on the tractor to various control valves on the scraper unit.

In the low-speed ratios in the tractor power train the relative displacements of pump 20 and motors 25 are such that no torque is supplied to the motors until the tractor wheels begin to slip or spin, at which time pump capacity exceeds that of the motors at that vehicle speed. This insures that the rear scraper wheels do not overdrive the tractor wheels in the low speed and also insures that any horsepower which is employed to drive the rear wheels is in excess of that required to obtain close to a maximum tractive effort between tractor wheels and the ground.

Figure 2:
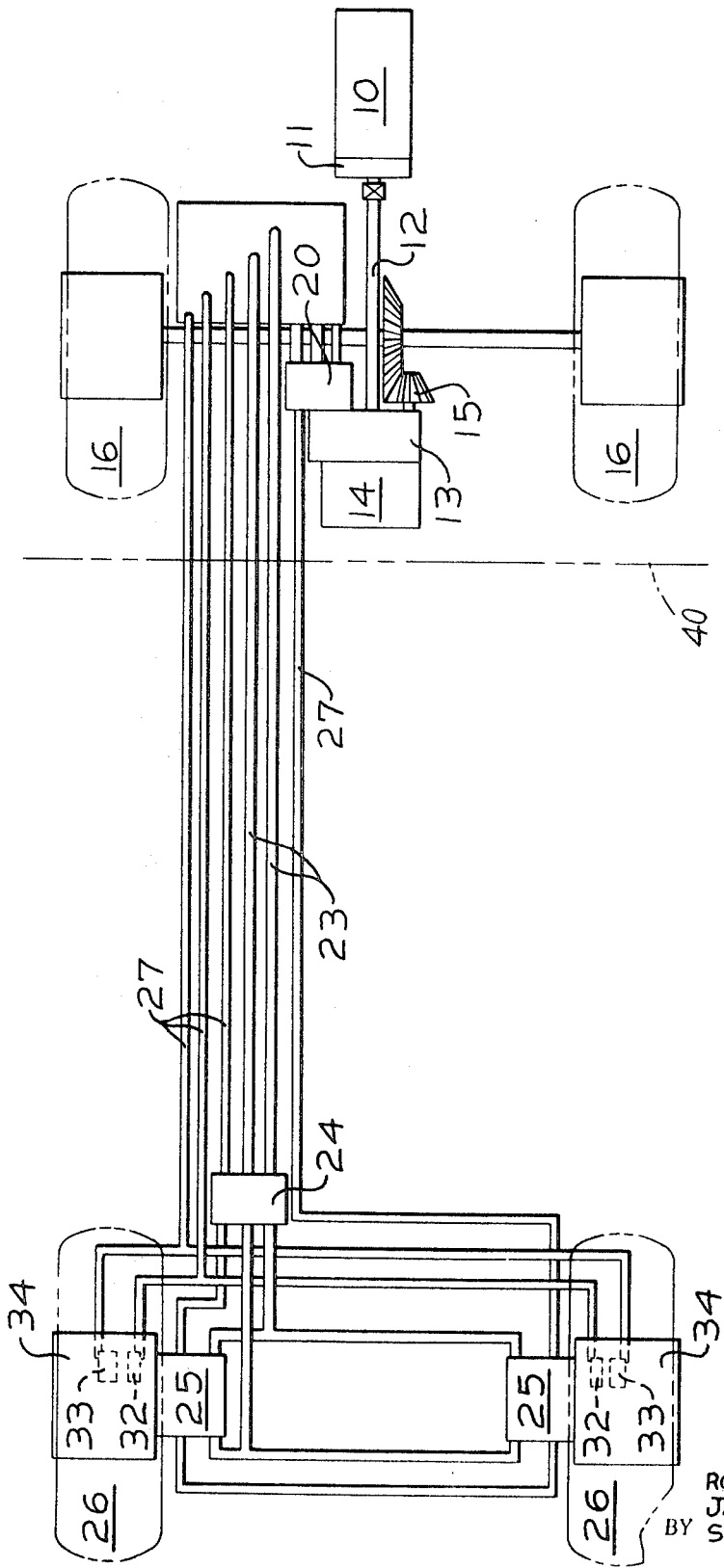
FIG. 2 is a plan view of the drive train shown in FIG. 1.

Referring to FIG. 2, a plan view of the drive train of the tractor-scraper unit is shown which illustrates the adjustable final reduction drive 34 between the hydrostatic motors 25 and the scraper wheels 26. This final drive, which may be of the type shown in U.S. Pat. No. 3,184,994 issued to Stahl, includes a low-speed clutch 32 and medium-speed clutch 33, which are operated by means of a fluid supplied through conduits 30 and 31. Simultaneously with the selection of the low- and medium-speed ranges in the power transmission 14 disposed on the tractor, the low- and medium-speed clutches, respectively, in the final drive are actuated.

Figure 3:
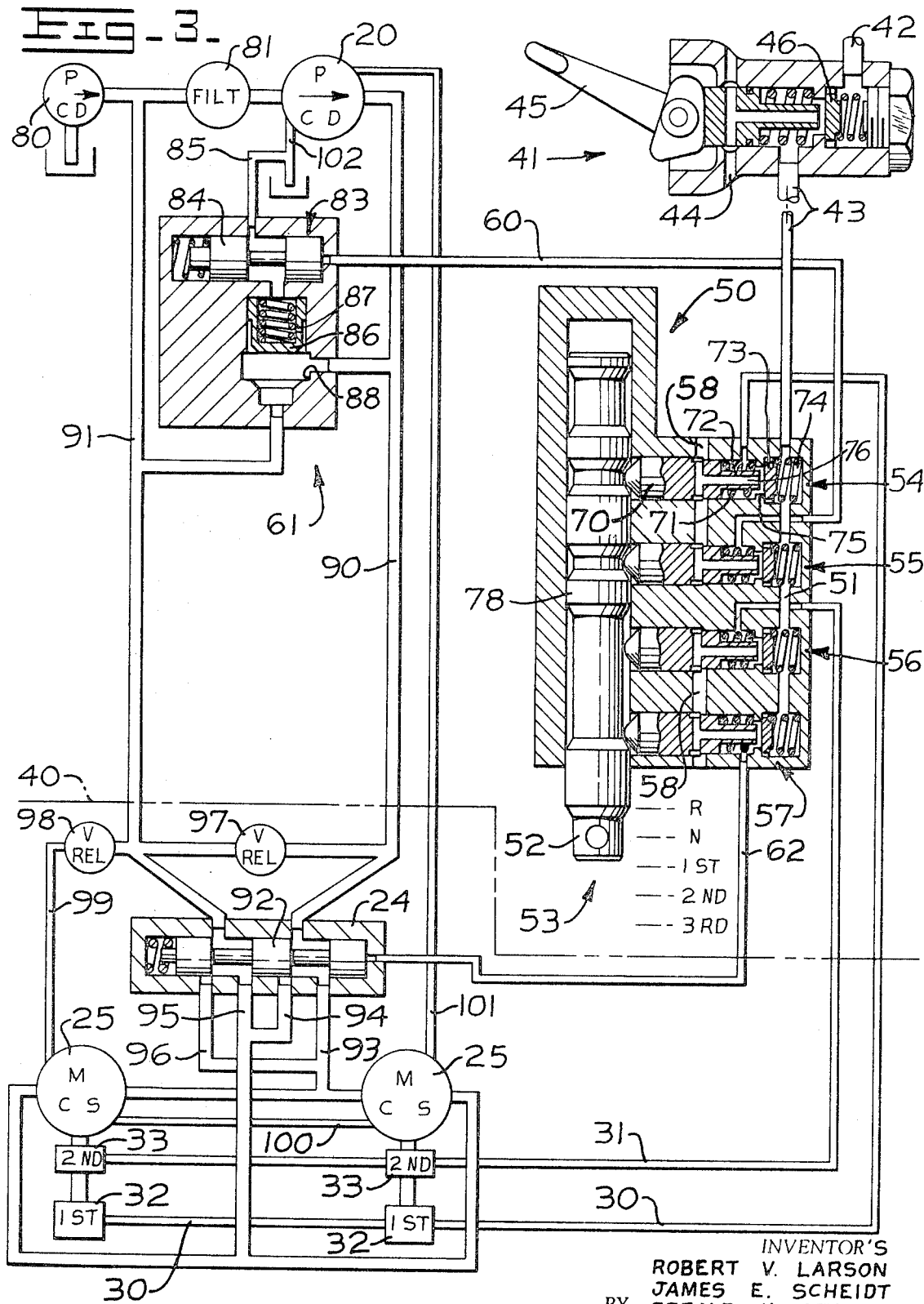
FIG. 3 is a control system for operating the hydrostatic assist means shown in FIGS. 1 and 2.
Figure 4:
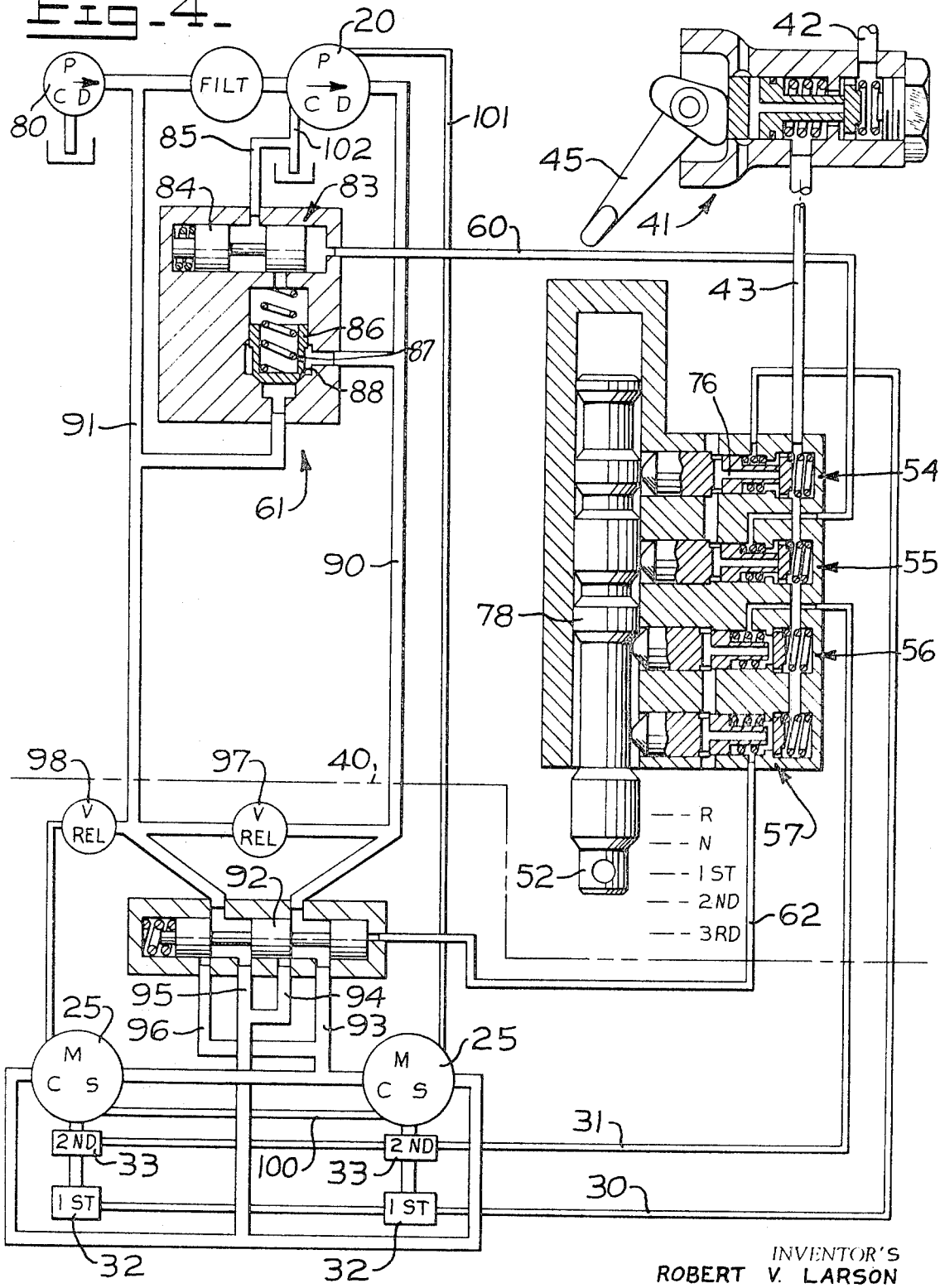
FIG. 4 is the automatic control system shown in FIG. 3 disposed in an operating position.

Referring now to FIGS. 3 and 4, shown is one form of a pneumatic control system for controlling gearing and reversing in the hydrostatic assist drive. Line 40 shown in FIGS. 2, 3 and 4 includes the division between the portion of the control equipment mounted on the tractor unit and the portion mounted on the scraper or trailer unit. A manual valve 41 is provided for activating the assist drive and supplies pneumatic pressure from a line 42 to line 43 connected to the main control valve 50. Operation lever 45 positions a piston 46 to either block line 42 or connect it to the line 43. When the manual-operated valve is positioned to exhaust the pneumatic pressure from the line 43, the main control valve will also be connected to the exhaust 44.

The main control valve 50 is illustrated with a central spool cam 52 that operates a series of four valves in a selected sequence. It has a pressure manifold 51 which is coupled to the conduit 43 and to the four valves 54, 55, 56 and 57 of the main control valve. These four valves are also in communication with an exhaust manifold 58 disposed in the body of the main control valve. The spool cam is connected to the power transmission of the tractor and moves to the various selected corresponding positions, indicated at 53, as the transmission 14 is changed in speed ratio. As the spool cam is moved, it will operate the proper valves to engage the power clutches and insure that the final drive for the rear scraper wheels is in the proper gear and rotates in the proper direction.

Each of the four valves is similar and the upper valve 54, coupled by means of the line 30 to the low-speed drive clutches 32 in the final drives on the rear scraper wheels, actuates or releases the clutches. The second valve 55 is coupled by means of a line 60 to a pressure relief valve 61 that controls the discharge of the pump 20. Third valve 56, coupled by means of the line 31 to the medium-speed clutches 33, controls these clutches. The fourth valve 57 is coupled by means of a line 62 to the flow diverter valve 24, which changes the flow of fluid from the pump unit to the motors to control the rotational direction of the hydrostatic assist motors 25.

Each of the individual valves in the main control valve is similar and only the construction of the upper valve 54 will be described. The valve consists of a piston 70 disposed in a bore formed in the body of the main control valve. A spring 71 is disposed to urge the piston toward the spool cam 52 while its opposite end, having a tubular extension 72, extends to a point adjacent one face of check valve 73. The check valve 73 is urged by a spring 74 into engagement with a seat formed by an annular flange 75. With the piston 70 and the check valve 73 in the positions illustrated, conduit 43 and manifold 51 are blocked from communication with the conduit 30. Since the end of tubular extension 72 is not in contact with the left face of check valve 73, the conduit 30 is communicated through a passage 76 to the discharge manifold.

The cam end of the piston is provided with a slightly rounded, conical-shaped end that engages an operating or cam surface 78 formed on the spool cam 52. Thus, when the spool cam is moved in its bore, these operating or cam surfaces will engage the cam end of the pistons and move them to lift the check valve 73 from its seat. In this position, referred to as the open position, the pneumatic pressure in manifold 51 is communicated to the conduit 30 to operate the low-speed clutches, as more fully described below. The remaining valves 55—57 have an identical construction and function in a similar manner controlling the pressure in their output lines.

The main pump control valve 61 includes a valve 83 with a spring-biased spool 84. The spool controls communication between a chamber behind a poppet valve 86 and a line 85 which communicates with the reservoir, when the spool is in the position shown in FIG. 3. Thus, the discharge pressure of the pump will lift check valve 86 off its valve seat 88 and divert the pump discharge back to the pump inlet line 91. The check valve 86 is provided with a small orifice 87 that equalizes the pressure on both sides of the valve and permits closing of the valve when the spool 84 is moved toward the spring by pneumatic pressure acting through the line 60 to activate the assist system.

A small charging pump 80 is provided for supercharging the main pump 20 through a filter 81 to avoid cavitation. Thus, the assist hydrostatic loop will always remain charged with hydrostatic fluid even during rapid changes in the speed of the hydrostatic assist drive unit, as well as during changes in the direction of rotation of the motors 25. The diverter valve 24 is provided with a spool 92 that control flows of the pump discharge to the motors so they will operate in the desired direction by changing their connections with the pump discharge line 90 and the pump return or suction conduit 91. Spool actuation couples the main discharge line 90 of the pump to a line 93 for forward rotation or the line 94 for reverse rotation. Simultaneously, the spool connects the exhausted fluid from the motors either to line 95 or line 96 to the suction line 91 of the pump.

A pressure relief valve 97 is located in a crossover path to protect the hydraulic loop of the assist drive from excessive hydraulic pressures. Another relief valve 98 communicating with the low-pressure conduit 91 insures a flow of cooling oil through the motors when the hydraulic assist unit is inoperative. Cooling oil circulates through a conduit 99, the housing of one motor 25, conduit 100, the housing of the other motor 25, and a conduit 101, to the housing of pump 20. This flow of oil is then returned to the reservoir through a conduit 102, which combines with the conduit 85 for return to the reservoir.

In the above-described system, a fluid positive displacement pump and fixed positive displacement motors are employed which, through a flow control, eliminate the need for variable displacement units when the clutches are employed.

OPERATION

The operation of the control system can be most easily understood by referring to FIG. 4 wherein the control system is shown in the lowest speed range of the vehicle. As explained above, the spool 52 of the main control valve is positioned through linkages with the tractors transmission 14 so they will be in compatible gear ranges. With the manual on-off valve 41 shifted to the operating position, pneumatic pressure (source not shown) is supplied to the main control valve through the conduit 43. In the lowest speed range, first, the valves 54 and 55 will be opened so that pneumatic pressure, through the conduit 30 will activate the first or low-speed drive clutches 32 on both hydrostatic assist drive motors and, through the conduit 60, move the spool 84 toward its spring to interrupt communication between the chamber above check valve 86 and conduit 60. Consequently, pressure will equalize on opposite sides of the check valve, permitting the spring to move it to the position shown in FIG. 4, preventing direct communication between pump discharge line 90 and pump suction line 91, so full hydraulic flow to the drive motors on the rear scraper wheels will be accomplished.

In this embodiment, when no tractor wheel slip is occurring, the fluid output of pump 20, as driven by the transmission input, is less than the flow required by the motors to drive the scraper wheels through the final drive mechanism. When resistance to the forward motion of the machine increases to the point the tractor wheels begin to slip, the speed of pump 20, in relation to the actual speed of the vehicle and hence speed of motors 25, will have a greater fluid discharge capacity relative to the motors' capacity so the motors will power the rear scraper wheels. The motors will then exert torque on the final drive mechanisms to drive the scraper rear wheels and increase the total tractive effort of the machine. As slip of the tractor wheels increases, more and more torque will be delivered through the drive motors 25, subject only to the limitations imposed by the maximum pressure setting of relief valve 97.

If the tractor transmission 14 is shifted into second, valve 56 will be opened, valve 55 will remain in an operating position, and the valve 54 will cut off pneumatic pressure to line 30 deactuating the low-speed clutches 32. Only the medium-speed clutches 33 in the final drive means are activated when the vehicle is in second. Due to the selected step ratio between first and second speeds in the scraper transmission, when the unit is shifted to the second speed range, the percent of slip of the tractor wheels required to provide drive to the rear scraper wheels in this range is substantially zero, since the engine does not have the power to cause the tractor wheels to slip in this range except in extremely slippery ground conditions. Thus the rear scraper wheel drive will operate when the tractor wheels just start to slip, preventing loss of momentum of the machine before the rear wheel drive became effective. Otherwise, the system operates in the same manner as in the lowest range.

When the transmission 14 is shifted to third gear, all of the valves 54—57 will be rendered inoperative and the hydrostatic assist drive motors will be completely decoupled since assist is not required in this speed range. When the transmission 14 is shifted into reverse, valves 54, 55 and 57 will be actuated so valve 57 will shift the flow diverter valve 24 by supplying pneumatic pressure through the conduit 62 to move the spool of the valve 24 to communicate the line 94 to the discharge side of the hydraulic pump and communicate line 96 to the suction side of the pump 20. This will reverse the direction of fluid flow through the drive motors. This causes them to rotate in a reverse direction to drive the rear scraper wheels in reverse whenever slip of the tractor wheels exceeds the predetermined valves, or in this particular case approximately 8 percent.

DESCRIPTION OF MODIFIED EMBODIMENT

Figure 5:
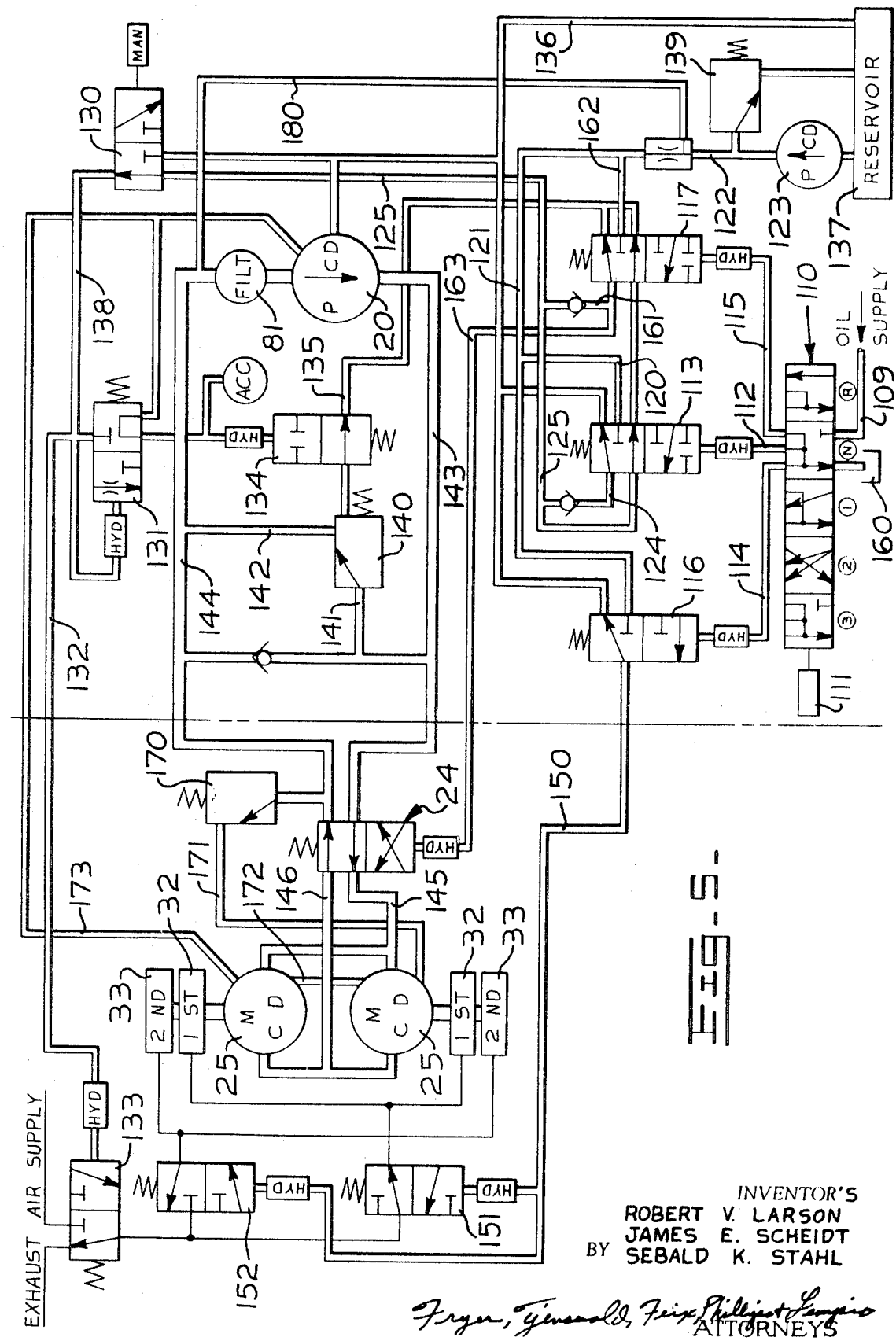
FIG. 5 is a second embodiment of an automatic control system for controlling the hydrostatic assist means shown in FIGS. 1 and 2.

Referring now to FIG. 5, there is shown a modified form of a control system in which all the controls are hydraulically operated. The hydraulic assist system is basically the same system illustrated in FIGS. 2 and 3, and similar components such as the drive motors and their operating clutches, plus the hydraulic pump, are captioned with the same numerals. Similarly, the diverter valve for controlling the direction of rotation of the motors is identical.

Referring to FIG. 5, a main control valve 110 is positioned by the linkages used for selecting the speed range of transmission 14 on the tractor and is a hydraulic valve which receives pressurized hydraulic fluid through a line 109 and drains to a reservoir 160. As shown in the drawings, the valve is in neutral position, with the three valves 113, 116 and 117 being connected to the drain. In this position, the discharge of hydraulic pump 20 is circulating through the relief valve 140 to its suction side, and the clutches on the drive motors 25 are disengaged. If the main control valve is then moved to the lowest speed position, hydraulic fluid will be supplied to the line 112 to actuate the valve 113 which will connect line 120 to the line 124. The line 120 is pressurized from a line 121, which is coupled to the discharge line 122 of a hydraulic pump 123, which may be the same pump used to supply hydraulic fluid for positioning the scraper controls. To prevent excessive pressures developing in the system, the pump is provided with a relief valve 139 that discharges back to a reservoir 137.

As shown in the drawings, the valve 130 is positioned to energize the hydrostatic assist drive means while in its other position, it will disengage the system and drain all control lines to reservoir. This valve is connected by a line 138 to a valve 131 and a valve 133, the latter of which controls the air supply to the clutches of the drive motors. In the lowest speed range, clutches 32 are operated by valve 133. Valve 131 is actuated to supply the fluid to operate the valve 134 which blocks the discharge of the relief valve 140 through line 135 to the drain line 136 to the reservoir. This prevents the circulation of the discharge of the pump 20 directly between its discharge line 143 and its suction line 144, and in this respect, functions similarly to the valve 61 shown in FIGS. 3 and 4.

With the main control valve 110 shifted to the medium-speed position, the pressurized hydraulic fluid will be supplied to both valves 113 and 116 so the relief valve 140 will remain closed. Valve 116, moved to its other position now will supply hydraulic pressure through the lines 121 and 150 to the valves 151 and 152. Actuation of these valves will supply air pressure to the medium-speed clutches 33 and exhaust air from the low-speed clutches 32, so the medium-speed clutches will be engaged.

With the main control valve 110 is its third-speed position, all three valves 113, 116 and 117 will be connected to the drain 160 and thus deactivate the hydrostatic assist drive completely. The relief valve 140 will again open and permit direct circulation between the discharge and suction sides of the hydraulic pump 20.

For reverse, valve 117 is operated so it will supply pressurized fluid through the line 161 to the line 125 to operate the relief valve 140 and the air supply valve 133 to engage the low-speed clutches. Also, this valve will supply hydraulic fluid through a line 163 to the diverter valve 24 so the diverter valve will shift and reverse the flow of fluid through the motors 25 connected to the lines 145 and 146.

In order to provide cooling oil to the motors during low-speed operation or when the hydrostatic assist drive means is deenergized, a cooling oil relief valve 170 is provided. It will supply fluid through the line 171 to the one motor 25, then through a crossover line 172 to the other motor 25, and then via lien 173 to the drain or the inlet of the hydraulic pump 20.

A line 180 connects the discharge of the pump 123 to the inlet of the main hydraulic pump 20. This insures supercharging of the pump 20 even during fast maneuvering operation or engaging or disengaging of the drive mechanism.

OPERATION OF THE MODIFIED EMBODIMENT

As explained above, since the fluid capacity of pump 20 is less than that of motors 25 at any given ground speed without wheel slip, power will not be transferred to the scraper rear wheels until slip of the tractor wheels exceeds approximately 8 percent. When the slip of the tractor wheels exceeds the 8 percent, sufficient oil will be supplied to the drive motors to cause the motors to drive the rear scraper wheels through their final drives.

It can be appreciated that this hydraulic control system functions similarly to the one previously described so its operation will not be separately described.

ALTERNATE EMBODIMENT

Figure 6:
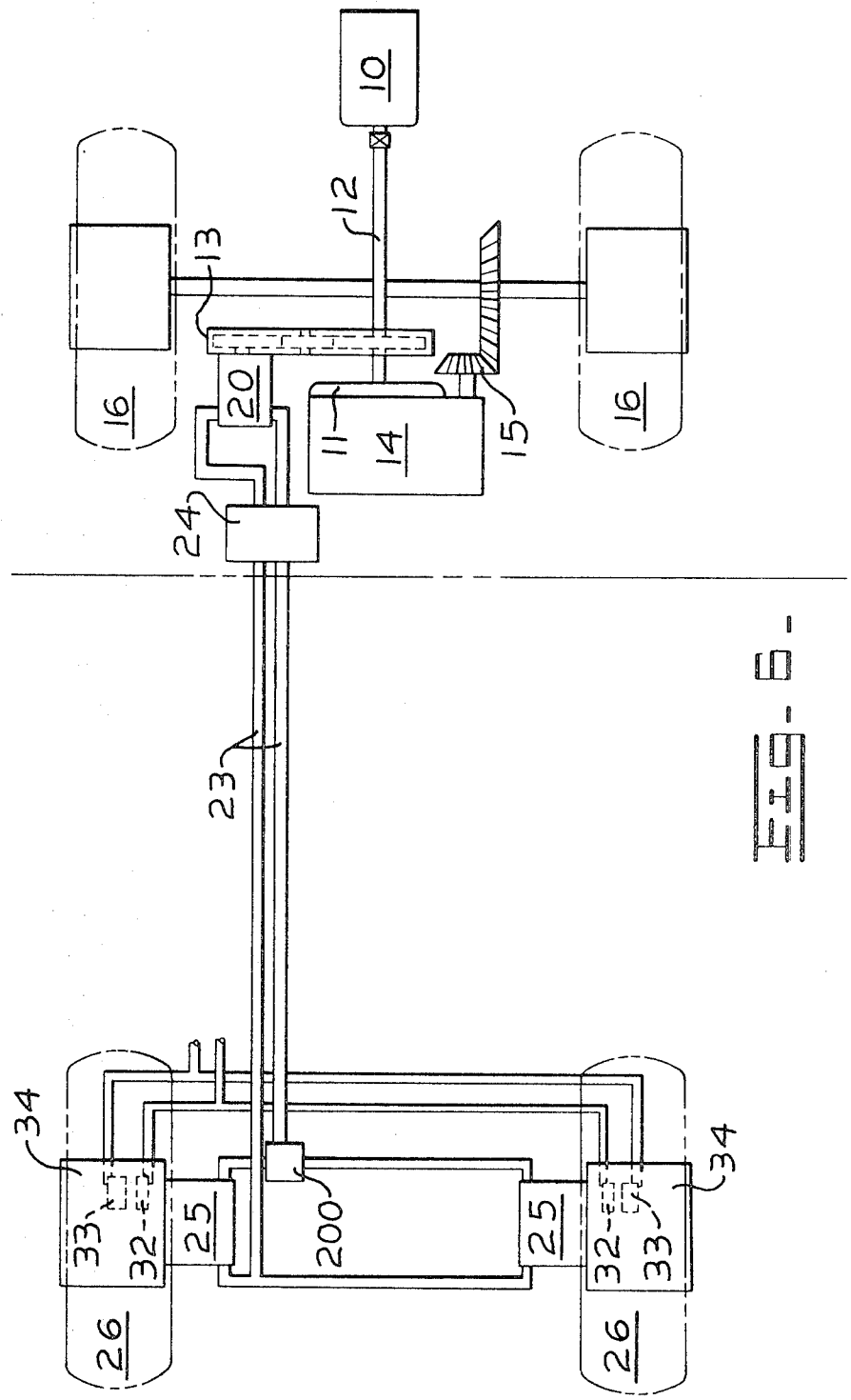
FIG. 6 is a plan view of the drive train disclosing an alternate embodiment of the invention.

Referring to FIG. 6, an alternate hydrostatic assist drive mechanism is shown wherein the pump is driven by a connection to the input side of the torque converter. With such an arrangement, excessive slip in the torque converter due to torque load will result in increased pump capacity relative to the capacity of the motors at the given vehicle speed so the motors will apply torque to the rear wheels. Usually the pump 20 is coupled to the input of the torque converter so that power transfer to the rear wheels will not occur until slip of the torque converter exceeds approximately 10 percent to 15 percent.

Except for the connection of the pump 20 in the vehicle drive train, this alternate system is the same as those previously described and can use the same control systems which have already been discussed. In view of the above, the system will not be described in detail and only the differences will be pointed out. Parts identical with those in previously described systems will be designated with the same numerals.

In this embodiment, a flow divider unit 200 has been added downstream of the diverter valve 24 so that approximately equal amounts of oil from the pump 20 will be fed to each wheel drive motor 25. Using such an arrangement, excessive spinning of one rear wheel can be avoided so the assist drive will be applied equally to both wheels. This provides an effective antispin system when one of the rear wheels has substantially reduced traction relative to the other rear wheel.

Under some conditions, any of the described hydrostatic assist systems can develop over pressures in the hydrostatic loop whereby the relief valve pressure between the pump discharge line 90 and suction line 91 is exceeded. Flow of high-pressure fluid over this relief valve will generate considerably heat and represents a loss of horsepower. In the case of a hydrostatic assist which uses the slip of nonpositive coupling to control the assist system, some of this lost horsepower can be better employed to provide additional drive on the tractor wheel since tractive effort does increase some even after the tractor wheels start to slip. To prevent this horsepower loss, the pump 20 is replaced with a variable displacement pump and its displacement is controlled by the discharge pressure of the pump. Normally, the pump is at its maximum displacement, but as the pressure of the relief valve between the pump discharge and suction lines is approached, a pressure-actuated operator decreases the displacement of the pump so it will not continue to deliver full capacity, at the relief valve pressure, above which no additional torque can be developed in the assist system. This prevents large volumes of fluid being pumped over the relief valve system and needless generation of heat, as well as increasing total tractive effort. However, it does increase the cost of the system.

What we claim is:

1. In an earthmoving vehicle having a tractor unit and a connected articulated trailer unit wherein the tractor unit includes an engine driving its tractor support wheels through a mechanical drive train with a torque converter between said engine and said drive train and wherein the trailer unit includes trailer support wheels which are not coupled to said drive train, an automatic hydrostatic assist system for driving said trailer support wheels comprising:

a fixed displacement hydraulic motor means located on said trailer unit;

gear means mechanically connecting said motor means with said trailer support wheels whereby torque developed by said motor means can be applied to drive said trailer support wheels;

a fixed displacement pump means located on said tractor unit;

connecting means having conduits coupling said motor means and said pump means in a hydrostatic loop wherein power will be transferred by the circulation of hydraulic fluid within said loop; and means mechanically connecting said pump means with said engine in a ratio wherein said pump means has insufficient fluid output volume through said loop to cause said motor means to drive said trailer support wheels until a predetermined amount of slip has occurred in said torque converter coupling said engine with said drive train whereat the increased relative fluid output of said pump means will transmit power to said trailer support wheels through said hydrostatic loop and said motor means.

2. The automatic hydrostatic assist system defined in claim 1 wherein the fixed displacement hydraulic motor means includes a plurality of hydraulic motors, one motor associated with each trailer support wheel and the hydrostatic loop includes a flow divider insuring a delivery of equal volume of hydraulic fluid to each of said motors.

3. The automatic hydrostatic assist system as defined in claim 1 wherein the gear means mechanically connecting the motor means with the trailer support wheels includes a plurality of ratios which can be selected simultaneously with gear ratios in the drive train for maintaining a relative relationship between the drive of the tractor support wheels and the assist drive of the trailer support wheels.

4. The automatic hydrostatic assist system as defined in claim 1 wherein the vehicle is an earthmoving scraper.

5. The automatic hydrostatic assist system as defined in claim 1 wherein the increased relative fluid output of the pump means includes drive means which will cause it to begin to transmit power through the hydrostatic loop and motor means when the slip in torque converter approaches 10 percent.